United States Patent
Venkataraman et al.

(10) Patent No.: US 7,042,451 B2
(45) Date of Patent: May 9, 2006

(54) METHODS USING SPECIFIC ATTRIBUTES AND GRAPH GRAMMARS IN GRAPH-BASED TECHNIQUES FOR FEATURE RECOGNITION

(75) Inventors: Sashikumar Venkataraman, Mumbai (IN); Milind A. Sohoni, Mumbai (IN)

(73) Assignee: Geometric Software Solutions Co., Limited, Mumbai (IN)

( * ) Notice: Subject to any disclaimer, the term of this patent is extended or adjusted under 35 U.S.C. 154(b) by 474 days.

(21) Appl. No.: 10/418,304

(22) Filed: Apr. 18, 2003

(65) Prior Publication Data

US 2003/0214503 A1    Nov. 20, 2003

Related U.S. Application Data

(60) Provisional application No. 60/373,654, filed on Apr. 19, 2002.

(51) Int. Cl.
*G06T 17/00*    (2006.01)

(52) U.S. Cl. .................................................. 345/420

(58) Field of Classification Search ................ 345/420
See application file for complete search history.

(56) References Cited

OTHER PUBLICATIONS

Sakurai et al., "Recognizing Shape Features in Solid Models", 1990, IEEE Computer Graphics and Applications, pp. 22-32.*

* cited by examiner

*Primary Examiner*—Almis R. Jankus
(74) *Attorney, Agent, or Firm*—Stites & Harbison PLLC; Ross F. Hunt, Jr.

(57) ABSTRACT

A computer-based feature recognition method is used to recognize features in a part of which are of a similar shape. A predetermined set of attributes are generated to represent a user-defined feature. This set is then used to produce an attributed graph which captures the feature shape. The graph is used in recognizing features of a shape similar to the feature shape in a solid model. To recognize a family of a shape feature with a variable number of faces, the shape feature is represented using a grammar employing symbols, rules and a terminating condition. Each symbol denotes an attributed face-adjacency graph and the rules denote permissible topological variations.

18 Claims, 5 Drawing Sheets

METHODS USING SPECIFIC ATTRIBUTES AND GRAPH GRAMMARS IN GRAPH-BASED TECHNIQUES FOR FEATURE RECOGNITION

CROSS-REFERENCE TO RELATED APPLICATION

This application claims benefit of U.S. Provisional Application No. 60/373,654, filed on Apr. 19, 2002.

FIELD OF INVENTION

The invention relates generally to three-dimensional solid modeling and, more particularly, to methods for recognizing features in a solid model using graph-based techniques.

BACKGROUND OF THE INVENTION

Solid modeling is a term that refers to a set of techniques that can be used to create and store computer based representations of physical objects. A number of techniques have evolved over the years for providing computer-based representations of three-dimensional parts. One of these techniques is Boundary Representation (B-rep).

A Boundary Representation (B-rep) model of a mechanical part consists of a set of "faces," "edges" and "vertices," which are connected together to form a topological structure of the part. By using such a representation, it is possible to evaluate many properties of the part from its computer model. These include the mass, the volume, the moments of inertia and products of inertia. Additionally, such models enable computer-based analysis of stress and strains in the part under different loading conditions. B-rep based computer models can also be "cut" and examined in a manner similar to an actual part. For these reasons, a B-rep model of a part is known as a "solid" model. Other representations of solid models are also known in the art.

Software based on solid modeling is widely used by engineers to create models of parts that eventually have to be manufactured. Software such as SolidWorks (Solidworks Corporation), Pro/Engineer (Parametric Technology), I-DEAS (EDS), Mechanical Desktop (AutoDesk) are examples of solid modeling software.

Traditionally, work in feature technology has mainly focused in two areas: feature based design and feature recognition. In feature-based design, the basic unit is a feature that is defined as a region of design or manufacturing interest in a part. Most CAD systems provide a suite of standard features such as holes, ribs, extruded/revolved depressions, and protrusions for designing parts. The parts are designed as sequences of these features, and are represented as a design tree (or feature tree). However for many applications, the design tree may not provide the required information directly. For example, in manufacturing, protrusions in a feature tree need to be mapped to the complementary depressions while generating the tool path for machining. Further, the actual feature in the part may not correspond exactly to the feature in the design history due to feature interactions. For example, a blind hole could become a through hole due to the imposition of other features. In such situations, the only approach is to use feature recognition from the part model. In a few situations, one encounters models that do not have any feature information. This could result from modeling in non-feature based systems or from translation of data from one CAD system to another. In such cases, feature recognition is essential to extract the necessary information.

In the area of feature recognition, many techniques have been proposed and implemented. For a comprehensive review of feature recognition techniques, reference is made to Qiang Ji and Michael M. Marefat (Ji et al); "Machine Interpretation of CAD Data for Manufacturing Applications," ACM Computing Surveys, Vol. 24, No. 3, September 1997, which is herein incorporated by reference. This paper provides a comprehensive description of all the well-known feature recognition techniques that have been used so far, and also points out the relative advantages and disadvantages.

Several of the techniques described in the Ji et al reference use graph-based approaches for recognizing features. In the graph-based approach, features are represented using an attributed face-adjacency graph. This graph is constructed by using faces as nodes and edges as arcs. In addition, attributes are added to nodes and arcs representing the topological and geometric characteristics of the corresponding faces and edges.

Feature recognition proceeds by matching the feature graph (as constructed above) to an appropriate subgraph of the graph representation of the part. However, a graph-based approach tends to be computationally expensive, especially in the presence of feature interactions, since it involves sub-graph matching problems. The efficiency is hence critically dependent on the attributes used in the graph that aid in pruning down the search during recognition. Further, many of the approaches proposed so far use feature hints that depend on specific feature types that may not be generally applicable.

Considering feature interactions in more detail, the problem of recognizing a feature is simple as long as the faces belonging to the feature do not interact with other features in the part. In such simple situations, the attributes of the faces of the recognized feature are identical to the corresponding faces of the pre-specified feature. However, in most real-world parts, features interact with other features in the model, and thereby disturb the face attributes in the part. The problem of feature recognition of interacting features is considered below.

Feature interactions result in many kinds of topology variations in the corresponding face-adjacency graph. Simple feature interactions involve splitting of edges and faces. In more complex situations, edges may get removed, thereby resulting in loss of arcs in the face-adjacency graph. FIGS. 15(a) to 15(c) show examples of split edges/faces, and loss of edges in a pocket feature due to feature interactions with a protrusion feature. In FIG. 15(a), the semi-cylindrical protrusion interacts with the pocket, thereby splitting an edge of the pocket. In FIG. 15(b), the bottom face of the pocket feature is split into two by the rib feature. In FIG. 15(c), an edge of the pocket is lost due to the corner rib feature.

Interactions can also occur along the boundary of a feature. For example, in FIG. 16(a), the pocket is placed over a rib feature, and has a different set of base faces from the pre-defined UDF. In FIG. 16(b), a slot and an open pocket interact with each other along the boundary. Such interactions are termed as concurrent interactions. A special type of boundary interaction is formed when faces of the feature merge with other faces of the part. Such interactions are termed as virtual interactions. FIGS. 17(a) and 17(b) show two examples of virtual interactions. In FIG. 17(a), the side face of the pocket merges with a face of a rib. In FIG. 17(b), one of the faces of a rib feature merges with another face of the part.

Several approaches have been proposed and implemented to resolve feature interaction (see the Ji et al reference). Many of these approaches use virtual links to recover the lost face adjacencies. However, when interactions get complex with a combination of protrusion and depression features, it is difficult and computationally expensive to produce all the possible virtual links in the part.

One popular approach used to resolve feature interactions is by using the feature suppression method. This method has also been described in the Ji et al reference. Feature suppression is briefly discussed below.

Feature interactions generally result in a parent/child relationship between features. The feature that came earlier is referred to as the parent feature, and the feature that was modeled later is called the child feature. Such interactions are resolved using feature suppression. Using this strategy, the features that do not have any child features get recognized first. These features have their attributes undisturbed initially, and hence pass successfully through the matcher. Other features that have interacting child features do not pass through the matcher, and are not recognized at this stage.

The recognized features are subsequently suppressed in order to simplify the model, and facilitate the recognition of their parent features. Feature suppression involves removing the faces of the feature from the part by extending/shrinking the neighboring faces of the feature. The face deletion functionality is offered by many geometry kernels. This process is performed recursively till all the features are recognized.

SUMMARY OF THE INVENTION

The invention concerns computer-based methods, and a computer running the corresponding programs, which provide a framework for defining and recognizing features, in particular, user defined features, in solid B-Rep models.

The invention employs several software modules which operate on boundary representation solid models and which run on a computer. As will appear, the modules may be implemented in any programming language, such as C or C++, and may use local operators from known geometric modeling kernels.

The recognition software-based method of the invention receives a boundary representation from, for example, one of the solid modeling programs mentioned above or any other source capable of providing a standardized data structure for describing solids. The feature recognizer of the invention provides a unique graph-based framework for defining and recognizing a variety of user defined features (UDF). As is discussed below, there are a number of important aspects of the recognizer that are unique to the invention.

In accordance with a further important aspect of the invention, a rich set of topological and geometric attributes is used to capture the shape of the feature. These attributes aid in pruning down the search of the feature graph in the part graph and thereby reduce the computational time for feature recognition, thus making the method feasible in practice.

In addition to features with fixed number of faces, the framework also allows descriptions of families of features such as pockets, slots or ribs that have a variable number of faces and, in accordance with a further aspect of the invention, such feature families are described using new methods employing graph grammars.

Several feature interactions are handled efficiently by the recognition methods of the invention that are not handled by previous feature recognizers. As will appear, these feature interactions include feature interactions with other features in the interior/boundary of the feature.

In accordance with one particularly important aspect of the invention, there is provided a computer-based feature recognition method for use in recognizing instances of features in a solid model that are identical in shape to a user-defined feature that is defined using a fixed set of connected feature faces and base faces in a solid model, said method comprising:

generating a predetermined set of attributes to be used in representing the user-defined feature; and using the feature faces and the base faces of the user-defined feature along with said set of attributes to produce a feature graph, comprising attributed nodes and arcs, which captures the shape of the user-defined feature; and using the solid model along with said set of attributes to produce a part graph comprising attributed nodes and arcs; and using matching involving the feature graph and part graph to recognize instances of features in the solid model that are identical in shape to the user-defined feature.

Preferably, the attributes comprise the following: (i) number of concave edges in a face; (ii) number of convex-concave transitions in a face; (iii) number of concave chains of vertices in a face; and (iv) number of inner loops in a face.

The matching preferably comprises first matching a start node of said feature graph in the part graph, and then matching the remainder of said feature graph in the part graph. Advantageously, the method further comprises identifying the start node in the feature graph using values of the node attributes of the feature graph.

In accordance with a further very important aspect of the invention, there is provided a computer-based feature recognition method for use in recognizing instances of features in a solid model that are identical in shape to a user-defined feature that is defined by a set of connected feature faces and base faces in the solid model and having a boundary, and with permissible feature interactions only along said boundary of the feature, said method comprising:

generating a predetermined set of attributes to be used in representing the user-defined feature;

using the feature faces and the base faces of the user-defined feature along with said set of attributes to produce a feature graph, comprising attributed nodes and arcs, which captures the shape of the user-defined feature; and using the solid model along with said set of attributes to produce a part graph comprising attributed nodes and arcs; and using matching involving the feature graph and the part graph to recognize instances of features in the solid model that are at least partially identical in shape to the user-defined feature due to interactions along the feature boundary, and wherein said interactions along boundary of feature result either in: (i) multiple base faces of said instances of the user-defined feature; or (ii) virtual faces wherein feature faces merge with other faces in the solid model.

Preferably, the attributes comprise the following: (i) number of convex-concave transitions for a face; and (ii) a scribe attribute.

In an advantageous implementation, the base faces of the feature graph are ignored during said matching and wherein the attributes are matched only for the feature faces.

Preferably, the scribe attribute is used to determine if a feature face in a recognized instance is merged with any other face in the solid model thereby resulting in a virtual interaction. Advantageously, the method further comprises using the scribe attribute to split the feature faces of the recognized instance by the base faces to create a well-defined feature boundary. Preferably, the method further comprises suppressing the feature from the solid model using the well-defined feature boundary.

According to yet another very important feature of the invention, there is provided a computer-based feature recognition method for recognizing pocket instances of generic pocket feature in a solid model having edges wherein the generic pocket comprises one bottom face, at least one side face, at least one top face, and may comprise at least one opening, with at least one opening face, the method comprising:

using the convexity of an edge as an attribute for finding the pocket instances in the solid model; and using the solid model to produce a face-adjacency part graph comprising nodes and arcs representing faces and edges in the solid model, along with attributes associated with the nodes and arcs of the graph; and wherein finding one of the pocket instances further comprises finding a graph representing the one pocket instance as a subgraph in the part graph; and finding said graph representing the one pocket instance comprises producing a matched graph by first matching an initial graph comprising three nodes that represent the bottom face, one side face and one top face of a potential pocket instance in the part graph and further comprises a sequence of steps wherein, in each step, the matched graph expands to a larger graph that represents a greater number of faces of the potential pocket instance; and using a set of rules to specify said sequence of steps, wherein each rule comprises three predetermined graphs comprising a start graph, a target graph and a next graph, wherein the start and next graphs are subgraphs of the target graph; and providing a terminating condition that is evaluated at the end of said sequence of steps to verify if the matched graph resulting from said sequence of steps represents a pocket instance of the generic pocket feature.

In one embodiment, matching the initial graph comprises finding a subgraph comprising three nodes in the part graph, wherein the arc between the nodes representing the bottom face and the one side face has a concave edge attribute, and wherein the arc between the nodes representing the one side face and the one top face has a convex edge attribute.

In one preferred implementation, the set of rules comprises a rule for incorporating multiple side faces comprising:

using a start graph comprising at least three nodes representing the bottom face, a side face and a top face of the pocket; and using a target graph comprising at least four nodes representing the bottom face, two side faces, and a top face of the pocket, and a concavity attribute on the arcs representing the edges between the bottom face and the two side faces, and a convexity attribute on the arcs representing the edges between the two side faces and the top face; and using a next graph that is identical to said start graph.

In another preferred implementation, the set of rules comprises a rule for incorporating multiple top faces comprising:

using a start graph comprising at least three nodes representing the bottom face, a side face and a top face of the pocket; and using a target graph comprising at least four nodes representing the bottom face, two side faces, and two top faces of the pocket, and a concavity attribute on the arc representing the edge between the bottom face and the two side faces, and a convexity attribute on the arcs representing the edges between the side face and the two top faces; and using a next graph that is identical to said start graph.

In yet another preferred implementation, the set of rules comprises a rule for finding an opening comprising:

using a start graph comprising at least three nodes representing the bottom face, a side face and a top face of the pocket; and using a target graph comprising at least four nodes representing the bottom face, the side face, the top face and an open face of the pocket, and a concavity attribute on the arc representing the edge between the bottom face and the side face, and a convexity attribute on the arcs representing the edges between the open face and the bottom face, side face and top face; and using a next graph comprising of at least two nodes representing the bottom face and the open face.

In still another preferred implementation, the set of rules comprises a rule for finding a plurality of faces in each opening comprising:

using a start graph comprising at least two nodes representing the bottom face and one open face of the pocket; and using a target graph comprising at least three nodes representing the bottom face and two open faces of the pocket, and a convexity attribute on the arcs representing the edges between the bottom face and the two open faces; and using a next graph that is identical to said start graph.

Advantageously, the method further comprises backtracking, wherein a set of steps of said sequence of steps can be undone, whenever said terminating condition fails.

Preferably, the generic pocket feature can be specified in a grammar comprising said initial graph, said set of rules and said terminating condition.

Further features and advantages of the present invention will be set forth in, or apparent from, the detailed description of preferred embodiments thereof which follows.

DETAILED DESCRIPTION OF THE PREFERRED EMBODIMENTS

Before considering the invention in more detail, some applications of the invention will be discussed so as to put the invention in context.

The feature recognizer aspect of the invention is mainly used in semi-automatic recognition of features. A feature is first defined by the end application using a suitable interface. Application specific parameters can also be interactively defined using the framework provided by the feature recognizer. The feature recognizer is then used to recognize similar instances of the feature in the model. The parameters can then be extracted from the features for down-stream applications.

The recognizer can also be used in conjunction with other feature recognition modules for quick face-set recognition. In this application, a set of faces is selected interactively that represents a complete or a portion of a feature. In a preferred embodiment, independent feature recognizers are launched locally to recognize the remaining faces of the feature, and parameterize the feature accordingly. The recognizer is then launched for fast recognition of similar face-sets in the part.

The recognized face-sets are then parameterized by the respective feature recognizers. For example, an interactive rib module could be implemented to recognize and parameterize ribs after interactively picking a face of the rib. Advantageously, the recognizer is used to recognize similar ribs in the part and each of the recognized ribs is parameterized in a similar manner by the rib module.

Figure 1:
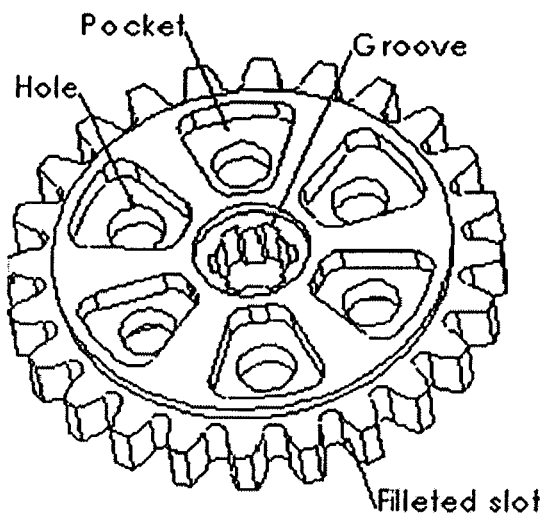
FIG. 1 is a top perspective view of a solid model of a first part comprising a circular arrangement of user defined features (UDFs)

The feature recognizer of the invention is also useful in recognizing pattern features. A pattern feature is a regular arrangement of a feature in a body. Patterns may be of various types like linear, circular, or rectangular. For example, FIG. 1 shows a circular pattern of UDFs. During pattern recognition, a UDF is first defined with the set of faces of one of the features of the pattern. The feature recognizer is then launched to find similar features in the part. The results of the feature recognizer are then post-processed to verify if a pattern feature can be created from the feature set.

The feature recognizer of the invention is also useful in recognizing features for manufacturing applications. One important class of manufacturing features are milling features such as slots and pockets that are machined using the milling process. During process planning, it is often desirable to obtain milling features along with the corresponding parameters from the input design part. Such features can be defined and recognized using grammars of the feature recognizer.

The feature recognizer of the invention is also useful in generating the design tree of imported parts which do not have feature information. The problem of recreating the design tree involves recognizing the sequence of design features in the CAD system along with the corresponding parameters which will result in a part that is identical to the imported part without feature information. One approach to solving the problem of recreating the design tree is by using feature recognition and suppression. Feature recognition is first used to extract the design features that potentially appear in the bottom of the design tree. The model is then updated by suppressing these features. The updated model denotes the intermediate model in the design tree without these features. This process is repeated on the updated model to recognize and suppress as many features as possible in the part. The final body after suppressing all features is the base-body and would appear as the first element in design tree. This is followed by the recreation of the recognized features in the reverse order of suppression.

Figure 2:
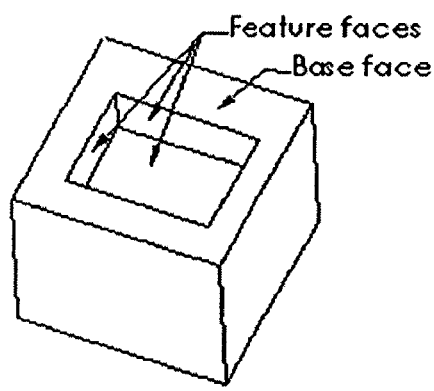
FIG. 2 is a top perspective view of a solid model of a second part having a blind pocket formed therein with feature faces and base faces labeled thereon.

Turning to an overview of the present invention, the feature recognizer abstracts a B-Rep model as an attributed face adjacency graph. The process of feature recognition is divided broadly into two stages. In the first stage, the user defines and names a set of UDFs. The number of faces in a UDF may be fixed or could vary to represent a family of features. The faces belonging solely to the feature are referred to as feature faces. The faces adjacent to the feature faces are referred to as the base faces. FIG. 2 shows an example of a square hole defined as a UDF. The top face is the base face while the bottom and the side faces form the feature faces of the UDF.

Features with fixed number of faces may be defined dynamically by using a set of faces that constitute a particular instance of the desired feature in a model. The face adjacency graph, also referred as the feature graph, is constructed for the face set and associated with the UDF. The constraints between the faces of the UDF are detected automatically by analyzing the faces and edges of the desired feature. These constraints are stored as attributes on the faces or edges of the feature. The user may modify these attributes or add new attributes on specific faces or edges of the feature graph. Along with local convexity and angles, attributes are used to capture other important geometric and topological properties of the UDF.

The second stage of feature recognition consists of recognizing similar instances of the UDF in a model. This problem involves finding all possible subgraphs that match the feature graph in the graph corresponding to the part. This stage is divided into two main steps. The first step is clue-finding in which a particular clue node of the feature is matched on the part. The second step consists of the graph matcher that performs the matching of the feature graph around the clue node.

As indicated above, FIG. 1 shows an example part containing patterns of pockets, grooves, filleted slots and holes. A single instance of each of these types can be defined interactively as a UDF. The feature recognizer automatically detects the remaining feature instances in the part.

In many manufacturing applications, it is helpful to define a family of features such as a pocket or a slot as a UDF. The feature recognizer provides a framework using graph grammars to represent such user-defined families of features. The variation within the feature family is captured as a rule of the graph grammar. The graph matcher is used recursively to verify each grammar rule.

Figure 3:
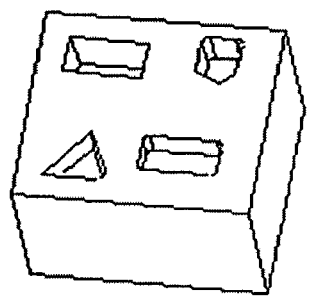
FIG. 3 is a top perspective view of a solid model of a third part having a plurality of blind pockets formed therein.

FIG. 3 shows an example of a model having many kinds of pockets that can be recognized by defining a single UDF.

Figure 11:
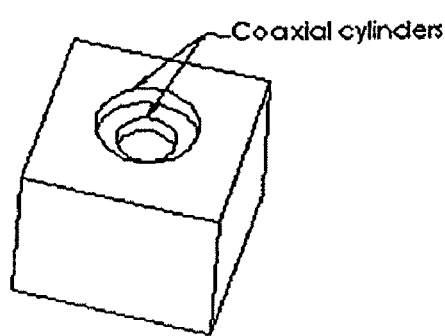
FIG. 11 is a top perspective view of a solid model of a tenth part illustrating the interaction of coaxial faces therein.

Before proceeding further, it is thought to be helpful to define some of the terms used above in the way that they are used in this patent application. As indicated above, a feature is defined as a collection of connected faces. For example, a hole feature is made of a cylindrical face and a planar bottom face. A UDF is represented in the form of a connected graph of the topological elements (faces and edges). In the above example of a hole feature, there would be two nodes connected by an arc. The geometric part of the UDF is represented in the form of attributes on the nodes and arcs. Each attribute is a structure that denotes some geometric property or relation between faces/edges. Attributes are of two kinds. The first kind of attribute denotes a geometric property of a single face or edge. Thus, in the above example, the node representing the cylindrical face would have an attribute that would denote that the node has cylindrical geometry. Similarly, the arc would have an attribute denoting that it is a right angle. The second kind of attribute, referred as relation, denotes the above-mentioned "constraints" (or geometric relationships) between two faces or two edges. For example, FIG. 11 shows an example of a part with a counterbore hole as a UDF. A coaxial relation is used between the two cylindrical faces to denote that the axis of the two cylinders match.

To explain further, a part graph is the topological representation of the solid model using nodes (for faces) and arcs (for edges). In addition, the part graph has attributes on the nodes and arcs that capture geometric shape, as just explained. Thus, if a model has 100 faces, the part graph would have 100 nodes. In contrast, a feature graph is the graphical representation of a feature (such as the cylindrical hole). Usually, this has fewer number of nodes since a feature usually is defined with a small set of faces (two in the cylindrical hole example above). A subgraph is simply a mathematical term like a graph and, more specifically, a subgraph is a portion or subset of the graph. Feature recognition involves finding subgraphs in the part graph that have the same structure (including the attributes) as the feature graph.

Considering attributes in more detail, during feature recognition, geometric and topological attributes are used to provide important hints to capture the shape and other characteristics of the feature. Topological attributes are used to capture local shape of the feature, while geometric attributes are used to capture local geometric characteristics. Some attributes such as surface type are associated with single nodes/arcs. Other attributes, such as coaxial faces, are attached to a pair of nodes/arcs, and are referred to as relations.

A basic built-in set of attributes used by the feature recognizer is found to be efficient in handling a large class of design and manufacturing features. The feature recognizer also provides flexibility to incorporate new attribute types without changing the basic recognition algorithms. The basic set of attributes is set forth and explained below. However, before considering specific attributes, the concept of a built-in set of attributes will be explored further. As is discussed in more detail elsewhere in this application, one aspect of the invention concerns defining a UDF by making a graph and putting attributes on the nodes and edges. We have one interface to make a UDF automatically by selecting a connected set of faces/edges of a part. In such cases, certain geometric relationships are automatically detected by analyzing the selected faces. This is the built-in set of attributes referred to above. More attribute classes can be added in the framework if necessary, but the present application is not concerned with this capability but is rather concerned with some specific attributes that are used to capture the geometric shape of the UDF.

The edge attributes are as follows:

Edge Convexity: This attribute is the most commonly used attribute in graph-based feature recognizers and is an important parameter that governs shape locally. In addition to classification of edges as concave or convex, edges are also classified as sharp or smooth. Smooth edges are also further classified as smooth-convex or smooth-concave based on the sign of the curvatures of the adjoining surfaces. These attributes are used for defining filleted UDFs.

Figure 4:
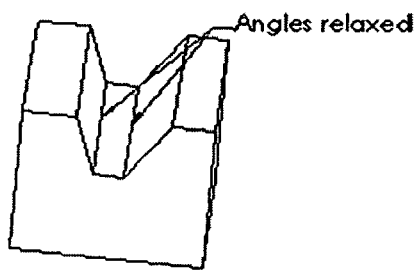
FIG. 4 is a top perspective view of a solid model of a fourth part having a UDF comprising a slot formed therein wherein no angle attribute constrains the edges of the slot.

Edge Angle: The angle at edges is also an important parameter that governs shape. The edge angle attribute can however be ignored in certain situations to represent a wider class of features. For example, FIG. 4 shows a UDF that represents the class of angled slots with no constraint on the edge angles. In such cases, no angle attribute is attached to the respective edges.

Figure 5:
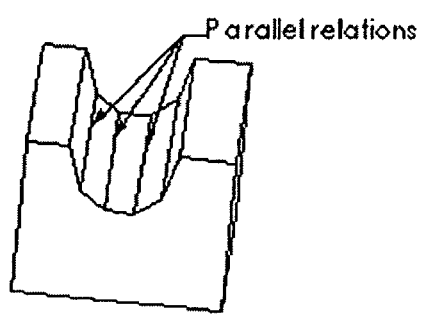
FIG. 5 is a top perspective view of a solid model of a fifth part having a UDF comprising a slot with parallel edges formed therein.

Parallel Arcs: In FIG. 4, if angles are ignored completely, the class of features would also encompass spurious slots that have the three planes in any orientation. However, most slots used in manufacturing are oriented along a particular direction, since they usually result from a sweep operation. This constraint is captured using parallel edge relations that denote parallelism between the corresponding edge geometry. The tolerance for checking parallelism is also user-defined to include small drafts. FIG. 5 shows an example of a multiple face slot that has a set of parallel edges as an important clue.

Figure 6:
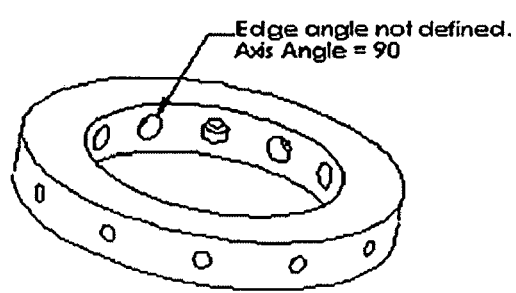
FIG. 6 is a top perspective view of a solid model of a sixth part having a cylindrical hole feature with a cylindrical base face.

Axis Angle: The edge angle is undefined if the angle varies along the edge. However, in such cases, there may be other angle attributes that can be associated with the edge. One such attribute is the angle between the axes of the adjoining surfaces. FIG. 6 shows a cylindrical hole on another cylindrical surface. The right angle between the two axes imposes an important constraint on the edge.

The face attributes are as follows:

Surface Type: The underlying surface type is an important geometric attribute for faces. However, the surface type can occasionally be different though the actual surface geometry is the same. For example, a cylinder could be represented as a rational spline during the course of data translation. In such cases, a simplification module is used that recognizes the surface form based on geometric invariant properties of the surface. Further, the surface type of base faces can also be used to restrict the definition of the UDF. For example, a UDF of a simple hole or a counterbore hole drilled on a planar face could be defined by adding the surface type attribute on the base face of the feature graph.

Figure 7:
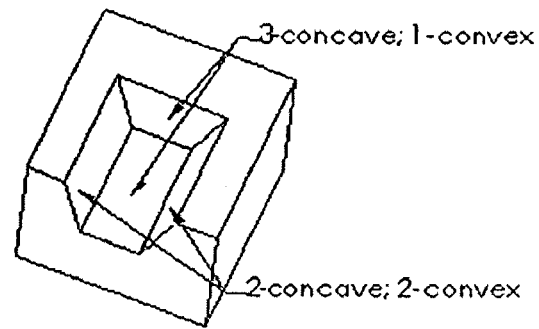
FIG. 7 is a top perspective view of a solid model of a seventh part having a slot therein, illustrating the number of convex and concave edges thereof.

Number of Convex/Concave Edges: These numbers help in topological classification of various faces of the UDF. FIG. 7 shows the classification of the faces of the illustrated slot based on this attribute.

Figure 8:
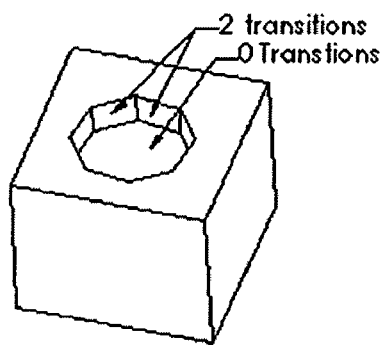
FIG. 8 is a top perspective view of a solid model of an eighth part having a pocket therein, illustrating the faces and the number of convex-concave transitions thereof.

Number of Convex-Concave Transitions: This is the sum of all transitions from convex edge to concave edge or vice-versa in a traversal along the boundary of a face. Unlike the number of concave or convex edges, this attribute is independent of feature size, and hence is useful in defining feature families. For example, in FIG. 8, the number of concave edges in the bottom face of a pocket increases with the number of sides of the pocket; however, the number of transitions for each face of the pocket remains the same.

Figure 9:
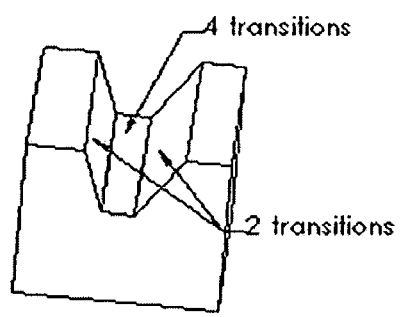
FIG. 9 is a top perspective view of the solid model of the part shown in FIG. 4, illustrating the number of convex-concave transitions for each face of the slot formed therein.

The number of transitions also provides important clues during recognition of a family of features. For example, a face with no transitions is a clue for the bottom face of a pocket or the top face of a boss, while a face with four transitions is a clue for a slot face. FIG. 9 shows a part illustrating the transition numbers for the faces for a slot.

Figure 10A:
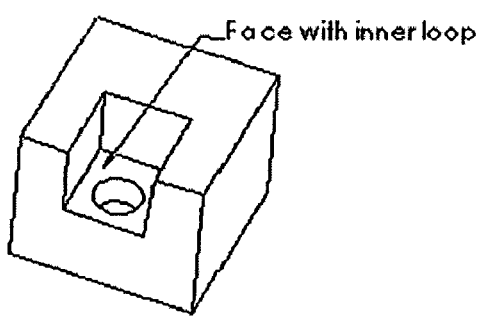
FIG. 10 is a top perspective view of a solid model of a ninth part illustrating the inner loops and concave vertices for interacting features therein.
Figure 10B:
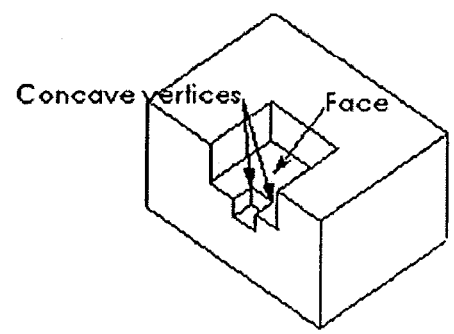

Inner Loops and Concave Vertices in a Face: These attributes are useful for UDFs that are a combination of atomic features. In such cases, the interacting faces have inner loops and/or concave vertices. A vertex is defined as concave with respect to a face if the adjoining edges of the vertex lying on the face meet concavely at the vertex. FIG. 10 shows an example of a hole in a slot defined as a UDF in which the bottom face of the slot has an attribute denoting the presence of an inner loop.

Coaxial Faces: This relation is between two faces that share the same axis. This relation is especially useful to represent axial symmetric features such as counterbore or countersunk holes. FIG. 11 shows an example of a part with a counterbore hole that has a coaxial relation between the two cylindrical faces.

Figure 12:
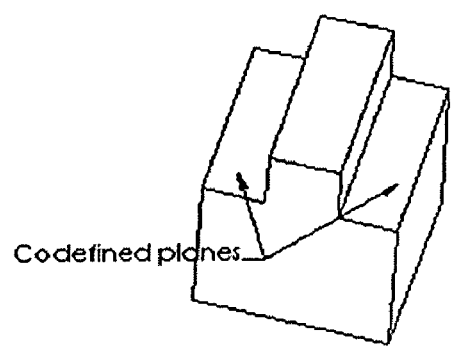
FIG. 12 is a top perspective view of a solid model of an eleventh part having co-defined faces thereon.

Codefined Faces: This relation is between faces that have exactly the same underlying geometry. This relation is useful in determining split faces in the feature neighborhood. FIG. 12 shows a part with a protrusion slot (or a rib) that has split base faces. The codefined attribute is attached to the base faces of the feature graph to denote that the split.

Dimension Attributes: The topological and geometric attributes used above are dimension independent. This enables matching of similar features that may differ in dimension from the original feature definition. In order to match dimensions, the user can add dimension related attributes such as perimeter and aspect ratios to the faces of the UDF.

Turning now to an overview of graph matching, the problem of feature recognition involves finding similar instances of the UDF in a part. In graph matching, the entire part is first converted into a face adjacency graph. Attributes such as angles and convexity are pre-computed on the part before matching, while relations are verified dynamically during the matching process. The problem of feature finding becomes a subgraph detection problem in which the feature graph (with the attributes) must be matched to similar "instances" in the part. This is done by the graph matcher method or module of the feature recognizer of the present invention. Before considering the graph matching algorithm in more detail, the concept of similar instances will be explored further. As indicated above, a UDF is a definition of a feature. This definition is derived prior to recognition. Typically, there would be a set of UDFs defined, with each representing one feature type. The above-mentioned example of a cylindrical hole being represented as a graph of two nodes is one UDF. After defining a feature, one would typically recognize occurrences of the feature in a solid model. The recognized features are termed "instances." For example, the solid model could have ten such holes. Recognition involves finding all these holes (all of the instances) that match with the defined UDF for a hole. Thus, in general, an instance can be of any UDF (hole slot/pocket).

Turning now to the graph matching algorithm or method of the invention, the graph matching algorithm begins by matching a starting node of the UDF with a candidate node of the part. This starting node (also called the clue node) is identified in the UDF with a set of heuristics that use the topological and geometric attributes of the corresponding face. The idea of the heuristics is to select the node that is "most unique" to the UDF, and is possibly the least commonly occurring in the part. The proper selection of the clue node helps in reducing the number of wrong attempts during matching and thereby increases the speed during recognition.

To determine the most unique node in a feature, an algorithm is used to compare two nodes and to determine which node among the two nodes is more unique. This function is then used repeatedly to order all the nodes in the feature graph to determine the most unique node among a set of nodes.

Algorithm: CompareNodes
Input: Two nodes in the feature graph
Output: The node which is more unique
Procedure CompareNodes (node n, node n2):
If the number of inner loops in n1 is greater than those in n2, then return n1.
If the number of inner loops in n2 is higher than those in n1, then return n2
If the number of concave vertices in n1 is greater than those in n2 then return n1.
If the number of concave vertices in n2 is greater than those in n1 then return n2.
If the number of concave edges in n1 is greater than those in n2 then return n1.
If the number of concave edges in n2 is greater than those in n1 then return n2.
If the total number of edges in n1 is greater than those in n2 then return n1.
If the total number of edges in n2 is greater than those in n1 then return n2.
If the number of concave-convex transitions in n1 is greater than those in n2 then return n1.
If the number of concave-convex transitions in n2 is greater than those in n1 then return n2.
If n1 is not of planar surface type and n2 is of planar surface type, then return n1.
If n2 is not of planar surface type and n1 is of planar surface type, then return n2. If both the nodes are planar, then return n1.
End CompareNodes.

The above function is based on the attribute values of the two nodes. The attributes are prioritized in a sequence so that less commonly occurring attributes appear first in the sequence. This priority has been determined by analyzing several solid models with many interacting features.

The next step involves matching the remaining set of nodes of the UDF to the part graph, given an initial match of the clue node. If a match is found, a one-to-one mapping of the feature graph into the part graph is expected. Before matching, the set of nodes in the feature graph is ordered using a breadth first search (BFS) algorithm from the clue node. The graph matcher is a recursive algorithm that matches the next unmatched node of the UDF with the candidate node in the part. The basic structure of the graph matcher algorithm in accordance with a specific exemplary embodiment of the invention is described below.

Algorithm: Graph Matching

Input: A list of nodes L of feature graph; a partial match of feature graph with part graph; and the next unmatched node n in the UDF Output: A boolean value to denote success or failure. If successful, then the complete match is also computed.

Procedure DoMatch(node n, . . . ):

Get the list P of potential nodes in part that can be topologically matched with n.

For each node p in P do

Verify node attributes of n and p.

If any node attribute does not match, then continue.

Verify arc attributes for arcs around n and p.

If any arc attribute does not match, then continue.

Match n with p.

Get next unmatched node m in L

If DoMatch(m, . . . ) succeeds then break

Else Unmatch n and continue

End do

If n has got matched then return success.

Else return failure.

End DoMatch.

In step 1, the potential nodes that can be matched to the input node are found from the neighbors of the previous matched node. This assumes that at least one neighbor node of the input node is already matched. This assumption is valid since the feature graph is assumed to be connected, and the ordering of nodes is obtained by a BFS. Each matching further verifies if the set of attributes of the node in the UDF matches the node in the part. The attributes of the neighboring arcs are also verified subsequently. The matching ends when either a successful match is found or when all possibilities have been tried and no match is found.

The above graph matching algorithm is used for recognizing feature instances that do not have any feature interactions and have the same base-face configuration as the corresponding UDFs. Such feature instances are termed as non-interacting features. These instances have all the attributes exactly matching the corresponding attributes in the UDF and hence pass successfully through the matcher.

Turning now to the problem of feature interactions in more detail, the basic feature recognizer uses the feature suppression method for resolving feature interactions. Using this strategy, the non-interacting features get recognized first. These features are suppressed by locally deleting the set of faces belonging to the feature. The matcher is then run again to recognize more non-interacting features. The process of recognition and suppression is continued till no additional non-interacting feature is recognized.

Figure 15A:
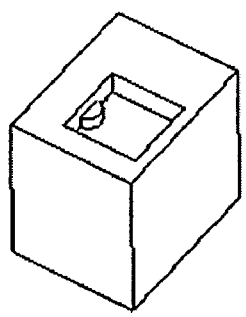
FIGS. 15(a), 15(b) and 15(c), which were discussed above, are top perspective views of a solid model illustrating three common kinds of feature interactions.
Figure 15B:
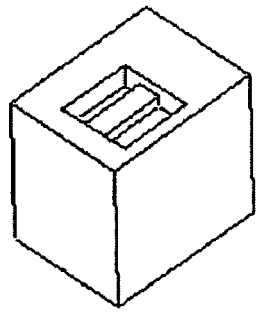
Figure 15C:
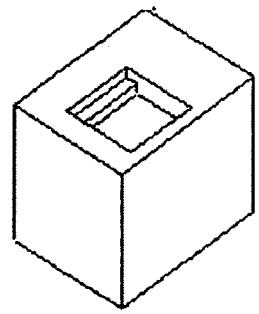

This method solves the problem of feature interactions in situations wherein the parent-child relationship clearly exists, and the child feature has the same base face configuration as specified in the UDF. In all of the examples shown in FIGS. 15(a), 15(b) and 15(c), the pocket feature is the parent feature of the corresponding protrusion feature. The feature recognizer would recognize the protrusion features first since it is a non-interacting feature. The protrusions are then suppressed, after which the pocket feature is recognized as a non-interacting feature.

Figure 16A:
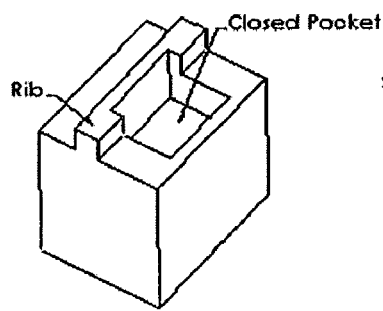
FIGS. 16(a) and 16(b) are top perspective views of solid models illustrating feature interactions along a boundary resulting in multiple base faces for the interacting features.
Figure 16B:
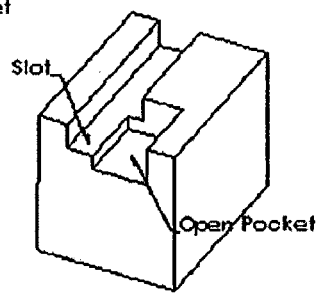

However, in more complex cases, such as those in FIGS. 16(a) and 16(b), feature interactions take place along the boundary of the feature, and the base face configuration is different from that of the specified UDF. In this kind of interaction, the feature interacts with other features along the boundary giving rise to more base faces than specified in the UDF.

The recognition of features with multiple base faces is achieved using a tolerant matching algorithm. This algorithm is used to recognize features that has feature interactions only in the boundary of the feature giving rise to multiple base faces.

In the tolerant matching algorithm, attributes on the faces of the UDF are either matched "strongly" or "weakly" during matching. An attribute is matched strongly if, during matching, the value of the attribute in the part is expected to be exactly equal to the value of the corresponding attribute in the UDF. An attribute is matched weakly if, during matching, the value of the attribute in the part is expected to be greater than or equal to the value of the corresponding attribute in the UDF. It may be noted that the matching of attributes is performed in steps 2 and 3 of the graph matching algorithm mentioned earlier. The steps of the tolerant matching algorithm are described below.

Algorithm: Tolerant Matching

The base faces of the feature graph are ignored during matching.

Divide the feature faces of the UDF into two sets. The first set is made up of the feature faces of the UDF that do not have any base face as a neighboring face. The second set is made up of the remaining feature faces of the UDF that have at least one base face as a neighboring face.

For the first set of faces, all the attributes are matched strongly.

For the second set of faces, the following face attributes are matched weakly: (i) number of convex and concave edges; (ii) number of chains of concave vertices. The other attributes are matched strongly. Of particular importance is the strong matching of the attribute denoting the number of convex-concave transitions.

End Tolerant Match.

The basic idea of the tolerant matching algorithm is described below. Due to multiple base faces, the attributes of the feature faces that are adjoining a base face are disturbed. In particular, the number of convex/concave edges and the number of concave chains of vertices are affected. However, the value of these attributes due to multiple base face configuration is always higher or equal to the corresponding values in the UDF.

However, other attributes are unaffected due to multiple base faces. In particular, the attribute denoting the number of convex-concave transitions remains unchanged due to multiple base faces. This provides a strong clue during matching features which have feature interactions only along the boundary.

As illustrated, two slots A1 and A2 in FIG. 16(b), either the slot or the pocket can be recognized (tolerantly). Suppression of these features are done by passing all the feature faces to the face-deletion operation.

Figure 17A:
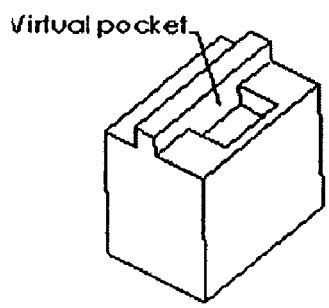
FIGS. 17(a) and 17(b) are top perspective views of solid models illustrating virtual interactions formed when feature faces of a pocket and rib feature merge with other faces.
Figure 17B:
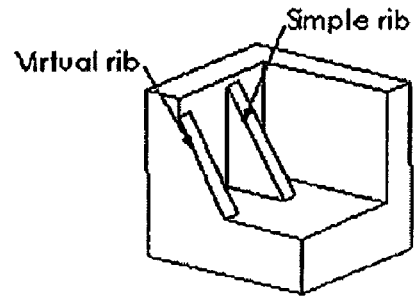

Another important kind of boundary interaction arises when a feature face merges with another face of the part thereby creating a virtual face. Examples of such interactions are shown in FIGS. 17(a) and 17(b) discussed above. Recognition of these features is achieved using a variation of tolerant matching algorithm.

For recognizing virtual interactions, the following attributes are matched weakly for the faces of the UDF that have at least one base face as a neighboring face: (i) number of convex and concave edges; (ii) number of chains of concave vertices; (iii) number of concave-convex transitions; (iv) number of inner loops in a face. However, during matching, the base faces are not completely ignored in the feature graph. A new attribute, termed as scribe attribute, is added as a relation between the feature faces and the corresponding base faces. The scribe attribute indicates that either the feature face shares an edge with the base face or that the base face, after extension, splits the feature face. The scribe attribute on an edge is evaluated by the matcher, and is guided by the UDF feature graph. When a defined arc between a feature and base face fails to match, the scribe attribute is queried by the matcher.

The scribe attribute is functionally similar to a virtual link used in prior art. However, a virtual link is added to the part prior to recognition, and hence it is difficult and computationally expensive to produce all the possible virtual links in the part. A scribe attribute, on the other hand, is evaluated during the matching algorithm of base faces only after the feature faces are matched. Hence, it is performed far fewer times than the number of potential virtual links in a part.

Figure 18A:
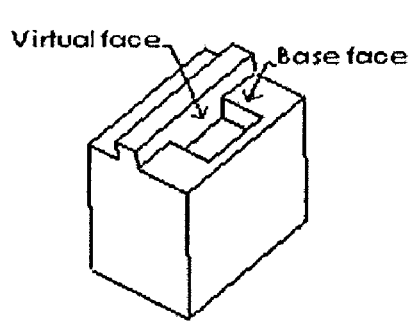
FIGS. 18(a) and 18(b) are top perspective views of a solid model illustrating the use of a scribe attribute for matching of a virtual pocket.
Figure 18B:
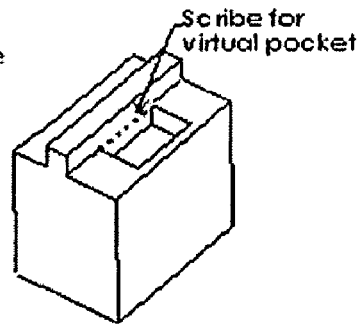

FIGS. 18(a) and 18(b) show the matching of the virtual pocket using the scribe attribute. The virtual face of the pocket does not share an edge (having the specified convexity attribute) with the base face. However, the base face, when extended, imprints the virtual face as shown in dotted lines in FIG. 18(b).

The scribe attribute also aids in suppression of the virtual feature. During suppression, the base faces imprint the feature faces in accordance with the scribe attributes creating a well-defined feature boundary. This is referred to as scribing. After scribing, the feature faces get isolated from the remaining faces, and can be suppressed using the normal face-deletion operation.

Figure 19A:
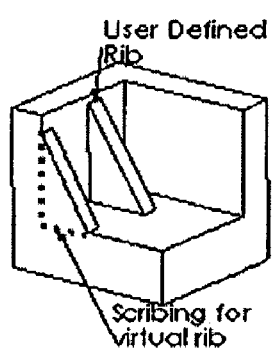
FIGS. 19(a) and 19(b) are top perspective views of a solid model illustrating the use of scribing for virtual ribs.
Figure 19B:
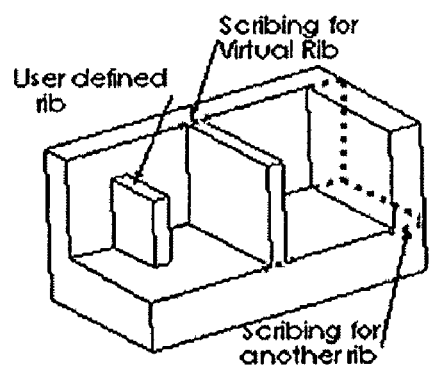
Figure 20A:
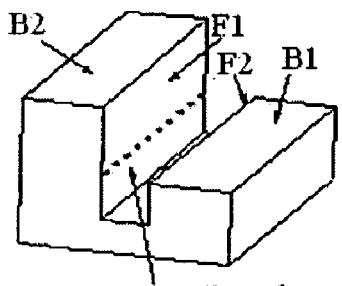
FIGS. 20(a) and 20(b) are top perspective views of a solid model illustrating the use of a scribe attribute for a virtual slot.
Figure 20B:
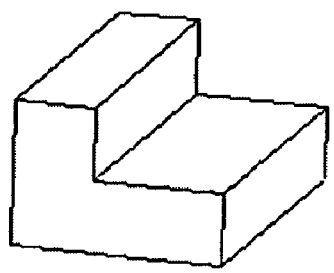
Figure 21A:
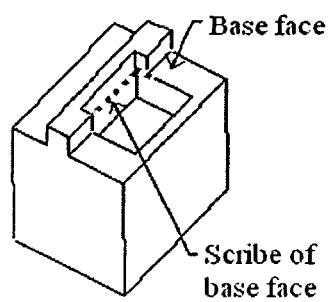
FIGS. 21(a) and 21(b) are top perspective views of a solid model illustrating the interpretation of multiple base pockets as a virtual pocket.
Figure 21B:
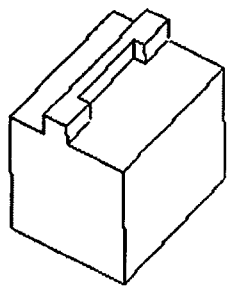
Figure 22A:
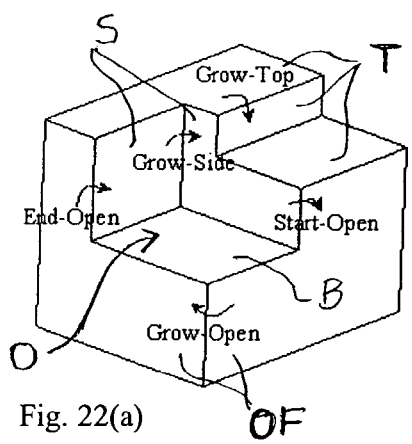
FIGS. 22(a), 22(b) and 22(c) are each a perspective view of a solid model illustrating various pocket grammar rules.
Figure 22B:
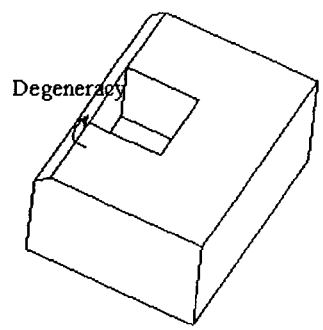

FIGS. 19(a) and 19(b) illustrate an example of using scribing for virtual ribs. The feature faces of the rib are scribed by the base faces using the scribe attribute. The scribed ribs are then suppressed easily using the face-deletion operation. FIGS. 20(a) and 20(b) illustrate an example of a virtual slot. In this example, there are two possible matches after matching the feature faces of the slot. Either B1 or B2 can match as the base face of the slot. However, the scribe attribute between B2 and F2 fails to match, whereas the scribe attribute between B1 and F1 succeeds. Hence, B1 is matched as the base face. The slot is then suppressed after scribing to create the part as shown in FIG. 22(b). It is noted that many multiple base face interactions also may have a corresponding virtual solution. For example, the pocket shown in FIG. 21(a) could also be recognized as a virtual pocket with the top face as the common base face. The base face is then used to scribe all the remaining faces of the pocket. The part after suppressing the virtual pocket is shown in FIG. 21(b).

Turning now to a discussion of graph grammars, the matcher algorithm discussed above deals with features that may be defined using a fixed set of faces. In order to represent a family of features such as pockets or slots with variable number of feature and/or base faces, graph grammars are used in the feature definition. The variation in the feature is captured by a set of rules in the graph grammar, where each rule denotes a graph matching problem. During recognition, rules are repeatedly applied until a terminating condition is satisfied that indicates successful recognition of a feature instance of the corresponding feature family.

The primitives of the graph grammar are symbols and rules. A symbol is an attributed graph that represents an atomic shape. Rules are of the form, E→M | E', where E, M, and E' are symbols such that both E and E' are subgraphs of M. Such a rule may be applied if E has already been matched to the part graph. The matcher then expands the matching to M, and thus creates a matching for the symbol E', which as said earlier, is a subgraph of M. The symbol E' can then be used as the starting symbol for the same or another rule.

A grammar consists of a starting symbol and a list of rules. The recognition stage starts by matching the starting symbol of the grammar to the part graph. The rules of the grammar are then applied in a loop to expand the feature graph until no further rules apply. Finally, a termination condition is checked to verify whether the match is acceptable.

Figure 13:
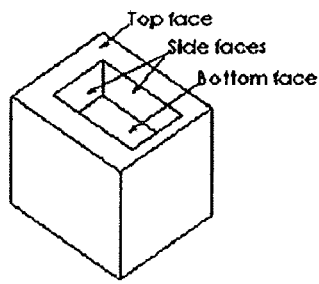
FIG. 13 is a top perspective view of a solid model of a twelfth part illustrating one example of a family of blind pockets having a common top face and a common bottom planar face. The particular example shown has a single blind pocket.

FIG. 13 shows a solid model of a part illustrating a family of blind pockets with a variable number of side faces with a common top face and a common bottom planar face. A particular instance of the family with four side faces is shown. The grammar for such family of pockets is given below. The grammar consists of a starting symbol and a single rule consisting of two symbols. The starting symbol consists of a graph with a single side face along with a bottom and top face. The target symbol consists of an additional side face, with the next matching symbol shown within the dotted curve. During recognition, the starting symbol is first matched in the part. The rule is then repeatedly applied to collect all side faces of the pocket. The terminating condition checks if the number of side faces is greater than two and if the final side face matched by the rule is same as the initial side face (assuming that the pocket has at least two side faces).

Grammar: Blind Pocket
Starting symbol: S1
List of other symbols: S1, S2
Rules: R[S1 → S2|S1]

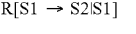

Figure 14:
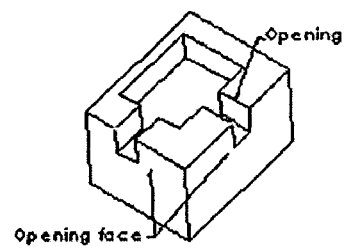
FIG. 14 is a top perspective view of a solid model of a thirteenth part illustrating one example of a family of open pockets each opening on a single face.

Attributes:
F1: planar (bottom face)
F2: (side face)
F3: (top face)
E1: concave, 90°
E2: convex
F4: (next side face)
E3: concave, 90°
E4: convex
E5: any convexity FIG. 14 shows a solid model of a part illustrating one example of a family of open pockets. Each opening is on a single face, and the pocket can have any number of openings. The grammar for the family of such open pockets is shown below. The top face could either be the same or could be split, and is denoted by the co-defined arc E10. The grammar restricts each opening of the pocket to a single face. Additional rules need to be added in the grammar to allow multiple faces for a single opening.

Grammar: Open Pocket
Starting symbol: S1
List of other symbols: S1, S2, S3
Rules: R1[S1 → S2|S1]

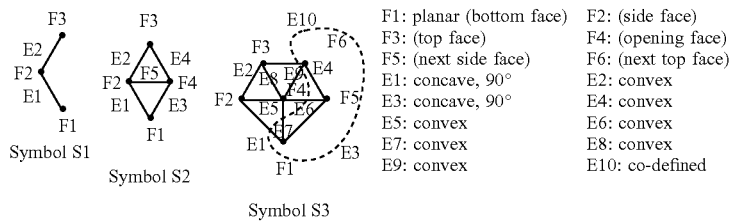

Attributes:

| | |
|---|---|
| F1: planar (bottom face) | F2: (side face) |
| F3: (top face) | F4: (opening face) |
| F5: (next side face) | F6: (next top face) |
| E1: concave, 90° | E2: convex |
| E3: concave, 90° | E4: convex |
| E5: convex | E6: convex |
| E7: convex | E8: convex |
| E9: convex | E10: co-defined |

In general, to incorporate each specific condition in the definition of the feature, it is necessary to add additional symbols and rules in the corresponding grammar. For example, new rules would be needed to include pockets with multiple base faces and degenerate situations in the same definition. Examples of a generic pocket with multiple rules are described below.

Considering symbols and rules in more detail, each symbol consists of an attributed graph to denote an atomic shape and a name denoting the symbol. In addition, any node or arc of the symbol graph can consist of a list of marks. These marks are used to distinguish various kinds of faces and edges during matching. For example, in the grammar for the blind pocket, we may want to collect the top, bottom and side faces of the pocket separately so as to subsequently parameterize the pocket. This is done by attaching different marks to the top, side and bottom nodes in the symbol graphs for the pocket grammar. After matching, these marks are used to classify the matched faces in the part.

Each rule consists of three symbols: the start symbol, the target symbol, and the next symbol. It also contains mapping from the nodes and arcs of the start symbol graph to the target symbol graph. This mapping identifies the start symbol graph as a sub-graph of the target symbol graph. Similarly, there is a mapping of nodes and arcs from the next symbol graph to the target symbol graph. These maps are used during the matching step.

In addition, each rule also contains maps for nodes and arcs that provides control of rematching already traversed entities. The node-map determines whether the traversed nodes of the target symbols can be used again for re-matching, while the arc_map determines whether the traversed arcs of the target symbols can be used again for re-matching. For the pocket grammar, all nodes are allowed to rematch again, but arcs are not allowed to be matched again by the matcher. This is done because the same side face can be traversed multiple times due to the presence of openings, while each side arc is traversed only once during the matching step.

In the framework of the present invention, all features are specified using a grammar that contains symbols, rules, and terminating conditions specific to each feature. The process of feature recognition is common for all features and uses repeatedly the basic matcher function DoMatch( ) which was described above. The following procedure outlines the basic matching function for a grammar.

Procedure DoMatchGrammar(UdfGrammar G, . . . ):
Match the start symbol S in part. Create context C.
If matching failed, then continue.
While any rule succeeds do
For each rule r in G do
ApplyRule(r). If rule succeeds then
Update current context C and collect
The matched nodes and arcs.
End do
End do
If terminating condition passes then return success
End DoMatchGrammar The graph matching begins by first matching the start symbol of the grammar in the part. It then enters a while loop to test all the rules. Each rule that has the start graph same as the current context graph is applied using the function ApplyRule( ). This function uses the node and arc mappings in the rule to create a subgraph matching problem to expand the start symbol graph to the target symbol graph in the part by calling the graph matching function DoMatch( ). If the matching succeeds, the context is updated so as to apply other rules that can be applied on the current context graph.

The implementation of the grammar allows addition of new rules to existing grammars in order to broaden the feature family. For example, in the grammar for blind pockets, new rules could be added to include pockets with multiple base faces and/or degenerate situations.

The implementation also retains the intermediate states of the matching results to enable back-tracking of rules. With the above-described matching routine it is possible for a particular rule to match wrongly, thereby leading to non-recognition of the feature. This can occur when two rules may apply, and only one of them results in a successful match. In such cases, it is necessary to backtrack the matched rule so as to allow other rules to be applied. In order to allow rules to backtrack from a match, each grammar holds a stack of all the contexts that got generated. In step (2) of the just described matching procedure, the previous context is pushed in a stack before updating the current context. During back-tracking of rules, the previous context is popped out from the stack and the matching continues.

Furthermore, it may also be necessary for a rule to backtrack from a particular valid match and attempt other matches. By enhancing the matcher procedure (DoMatch( )), a particular match can be back-tracked to attempt the "next" matches. This is implemented by ordering the nodes around each node in some well-defined sequence, and performing matching in that sequence. When a particular match needs to be back-tracked, the matcher returns the lexicographically next match using this sequence.

This implementation also allows different faces of the feature to be collected separately. For example, in the grammar for the blind pocket, the top, bottom and side faces of the pocket can be collected separately and can be used in subsequent parameterization of the pocket.

Turning to the interaction of features defined using grammars, feature interactions can be incorporated in the definition itself as additional rules within the grammar. Just as rules are used to recognize features with multiple feature faces, other rules can also be used in the grammar to allow multiple base faces and virtual faces.

Graph grammars for a generic pocket feature will now be considered. The pocket grammar allows multiple top faces, openings on multiple faces, virtual side faces and degeneracy. A generic pocket feature, which may be best understood by reference to the non-limiting example shown in FIG. 22(a), is a feature having a single bottom face (denoted B in the example shown in FIG. 22(a)), multiple side faces (two side faces S are shown), multiple top faces (three top faces T are shown), multiple openings (one opening o is shown), and multiple open faces (two open faces F are shown).

The symbols and rules for generic pocket grammar are as follows:

end-virtual rule is used to climb down from a virtual face to any ordinary side face. Again, the same virtual symbols are used in these rules.

The UDFs that have a fixed number of faces can be defined as special case of the graph grammar. The grammar for such features consists of a single rule that expands the clue node to the final feature graph. To allow multiple base faces or virtual faces in the feature definition, additional rules can be added to the grammar. This provides an alternative method to handle feature interactions of UDFs apart from the tolerant matching algorithm described above.

Turning now to the specification of grammars in detail, there are two ways in which a graph grammar can be specified. The first method is to programmatically define a new grammar by using the C++ class framework for symbols, rules and grammar. This method of specifying grammars programmatically involves writing new code every time a new feature is introduced. The other method is to specify the grammar in an Extended Markup Language (XML) file that can be dynamically interpreted by a program. The programming method is more flexible in introducing arbitrary attributes or terminating conditions, while the XML file-based method does not involve writing new

In the symbols, convexity attributes are shown, and + indicates convex and − indicates concave.

The start symbol for the grammar is S1. As is illustrated in FIG. 22(a), the grow-side rule denotes the rule to add a side face of the pocket, while the grow-top rule adds one top face of the pocket. The start-open rule opens the pocket, and changes the context from the main side symbol to a main open symbol. The grow-open rule adds open faces while the end-open rule brings back the context to the main side symbol. It is to be noted that the same symbol (opening symbol) is used in the start-open and the end-open rule since the attributes for the symbol is same for both these rules. These rules only differ in the mappings from the start to the target symbols, and from the target symbol to the next symbol.

The degeneracy rule, which is illustrated in FIG. 22(b), grows a pocket simultaneously along the top and side face, and handles degeneracy along the boundary.

Figure 22C:
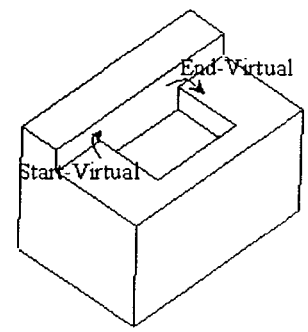

Referring to FIG. 22(c), the start-virtual rule is used to climb up along a virtual side face of the pocket, while the code for introducing a new feature family. These methods of specifying a grammar are described below in more detail.

The various C++ classes that have been provided by the grammar are described below. Using these classes, one can easily implement new grammars programmatically. There are three main interface classes, namely UdfSymbol, UdfRule and UdfGrammar, that need to be used for creating new feature grammars programmatically. These are described below.

All symbols are derived from a common base class, UdfSymbol. Each symbol contains a graph and a name denoting the symbol. Additionally, each derived class can provide functions to identify specific nodes and arcs of the corresponding symbol. For example, the starting symbol of the pocket contains member functions to identify the bottom, side and top nodes of the pocket. These functions aid in referring to the symbol while codifying the grammar rules and terminating conditions.

In addition, marks are used to classify specific faces/edges that are collected during matching. A mark is encapsulated using a class UdfMark that stores an integer identifier. Each node and arc in the symbol graph can hold a set of marks that are used to identify the faces/edges.

All rule are encapsulated in a common class, UdfRule. This class consists of three symbols; a start symbol, the target symbol and the next symbol. It also contains mapping from the nodes and arcs of the start symbol graph to the target symbol graph. This mapping identifies the start symbol graph as a sub-graph of the target symbol graph. Similarly, there is a mapping of nodes and arcs from the next symbol graph to the target symbol graph.

A grammar is encapsulated in a class, UdfGrammar, that consists of a start symbol, a set of rules and a terminating function. One can specify a new feature family such as a pocket, by deriving a new class UdfPocketGrammar, from the base class UdfGrammar. The symbols and rules specific to pockets can be added in the constructor of this class, and the terminating condition of the base class can be overloaded in the derived class.

The above classes provide a flexible method to add new grammars or modify existing grammars. However, each grammar addition or modification involves programming and compiling code. It would be useful if a user could modify or add a new grammar by specifying the corresponding symbols, attributes, rules and terminating conditions dynamically dynamically without writing and compiling new code. To enable dynamic grammar specifications, a new file format has been implemented for codifying grammars that can be interpreted by the program during runtime.

In accordance with a preferred embodiment of the invention, the file format used is based on the Extended Markup Language, more popularly referred as XML. XML is a language used to describe text information and to a large extent preserves the structure and semantics of the data in a form of a structured tree that can be read into any application using a XML parser. The syntax of a XML document is to be described by using a Document Type Definition (DTD), which is essentially a context-free grammar that provides the rules that define the elements and structure of the new language.

Appendix I below shows the specification of a user-defined feature in the XML format employed. This format can be automatically output for any procedurally defined grammar from the feature recognizer. Further, using a parser, the XML file can be read into the feature recognition program, and the corresponding grammar can be automatically generated. The XML format thus provides a language in which feature grammars can be defined dynamically.

The feature consists of a name followed by the corresponding grammar. The grammar specification begins with a set of markers used to classify the faces of the feature. In this grammar, 0 represents the bottom face, 1 represents the side face, and 2 represents the top face of the pocket.

The markers are followed by the list of symbols used in the grammar. Only two symbols are present in this particular grammar. The specification shows the complete description of the first symbol (S1) for the blind pocket. The only attributes used in this specification is the convexity attributes on the bottom and top arc of the symbol. Each symbol also contains the markers for reach of the nodes-arcs in the graph. The bottom, side and top nodes are identified using the markers.

The symbols are followed by the rules of the grammar. The grammar consists of one rule that expands the pocket along the side face. The rule contains the start, target and next symbols. Maps are used to establish the correspondence between the nodes and arcs of the start and target symbols and, similarly, between the next and target symbols.

Each rule also contains two maps for nodes and arcs that provides control of rematching already traversed entities. The node_match_map determines whether the traversed nodes of the target symbols can be used again for rematching, while the arc_match_map determines whether the traversed arcs of the target symbols can be used again for re-matching. The node_rematch_map determines whether the tagged nodes of the target symbols can be re-matched again with other nodes. For a blind pocket, all nodes are not allowed to rematch again, but arcs are allowed to be matched again by the matcher.

The final part of the grammar is the encoding of the terminating condition. A list of operations can be specified to make a wide class of checks as terminating conditions. In the pocket grammar, a check is performed to verify if the final matched node is same as the first side node matched. Since nodes are allowed to be re-matched (and arcs are not allowed to be re-matched), a blind pocket grammar would terminate by coming back to the first side face.

Appendix I: XML Format for the Pocket Grammar

The XML file contains the complete definition of the feature grammar. All the symbols and rules have been represented in the grammar. The basic element in a symbol is an attributed graph with nodes and arcs. Each attribute name denotes a specific attribute type that is provided in the basic framework. Markers are used to classify specific types of nodes and arcs (such as bottom face or side face of pocket). Rules are created using symbols and graph mappings between the start and next and target symbols. The terminating condition is expressed in a simple prefix language that contains some basic operators on nodes and arcs.

```
+ <udf_featuregrammar>
  - <feature_name>
      <feature_name>blind-pocket</          // feature name
      feature_name>
    </feature_name>
  - <feature_grammar>
    - <marker_list>                         // marks used
        <marker id="0" />
        <marker id="1" />
        <marker id="2" />
      </marker_list>
    - <feature_grammar_symbols>             // symbols used
      - <symbol id="0">
          <name>PocketPanel</name>          // first symbol shown
        - <symbol_graph>
          - <graph>                         // attributed graph of symbol
            - <nodes>
              - <node id="0">
                  <attributes />
                  <relations />
                </node>
              - <node id="1">
                  <attributes />
                  <relations />
                </node>
              - <node id="2">
                  <attributes />
                  <relations />
                </node>
            </nodes>
          - <arcs>
            - <arc id="0">
            - <attributes>
              - <attribute id="8" name="udf_convexity">
                  <Value>1</Value>
                  <Level>1</Level>
                </attribute>
```

```
            </attributes>
            <relations />
        </arc>
        - <arc id="2">
            <attributes />
            <relations />
        </arc>
        - <arc id="1">
            - <attributes>
                - <attribute id="8" name="udf_convexity">
                    <Value>0</Value>
                    <Level>1</Level>
                </attribute>
            </attributes>
            <relations />
        </arc>
    </arcs>
    - <node_marker_map>          // marks in a symbol
        - <node_marker>
            <node_id>0</node_id>
            <marker_id>0</marker_id>
        </node_marker>
        - <node_marker>
            <node_id>1</node_id>
            <marker_id>1</marker_id>
          <node_marker>
        - <node_marker>
            <node_id>2</node_id>
            <marker_id>2</marker_id>
          <node_marker>
    <node_marker_map>
    - <feature_nodes>
            <node_id>0</node_id>
            <node_id>1</node_id>
      </feature_nodes>
    - <base_nodes>
            <node_id>2</node_id>
      </base_nodes>
    </graph>
  </symbol_graph>
</symbol>
+ <symbol id="1">
</feature_grammar_symbols>
- <feature_grammar_rules>             // Rules
    - <rule id="0">                   // Grow side rule shown
        <name>GrowSide</name>
        <start_symbol>0</start_symbol>    // start symbol
        <target_symbol>1</target_symbol>  // target symbol
        <next_symbol>0</next_symbol>      // next symbol
      - <start_target_node_map>       // map from start to target
        - <map>
            <from>0</from>
            <to>0</to>
          </map>
        - <map>
            <from>1</from>
            <to>1</to>
          </map>
        - <map>
            <from>2</from>
            <to>2</to>
          </map>
      </start_target_node_map>
    - <next_target_node_map>          // map from next to target
        - <map>
            <from>0</from>
            <to>0</to>
          </map>
        - <map>
            <from>1</from>
            <to>3</to>
          </map>
        - <map>
            <from>2</from>
            <to>2</to>
          </map>
    </next_target_node_map>
+ <start_target_arc_map>
+ <next_target_arc_map>
    + <node_match_map>                // map to show if nodes can
                                      // be rematched
      - <map>
            <from>0</from>
            <to>0</to>
        </map>
      - <map>
            <from>1</from>
            <to>0</to>
        </map>
      - <map>
            <from>2</from>
            <to>0</to>
        </map>
      - <map>
            <from>3</from>
            <to>0</to>
        </map>
      <mode_match_map>
    + <arc_match_map>
      - <map>
            <from >0</from>
            <to>1</to>
        </map>
      - <map>
            <from>1</from>
            <to>1</to>
        </map>
      - <map>
            <from>2</from>
            <to>1</to>
        </map>
      - <map>
            <from>3</from>
            <to>1</to>
        </map>
      - <map>
            <from >4</from>
            <to>1</to>
        </map>
        <backtrack>0</backtrack>
    </rule>
</feature_grammar_rules>
- <terminating_condition>             // terminating condition
  + <check id ="0">
    - <operation>
      - <first>
        - <operation>
          - <first>
            - <operation>
              - <first>
                - <operation>
                  - <first>
                    <value>1</value>
                  </first>
                  <second />
                  <operator>GetMark</operator>
                </operation>
              </first>
              <second />
              <operator>GetNodesOfMark</operator>
            </operation>
          </first>
        - <second>
            <value>0</value>
          </second>
          <operator>GetNodeOfIndex</operator>
        </operation>
      </first>
    - <second>
      - <operation>
        - <first>
          - <operation>
            - <first>
              - <operation>
                - <first>
                    <value>1</value>
                  </first>
                  <second />
```

-continued

```
            <operator>GetSymbolOfIndex</operator>
          </operation>
        </first>
        - <second>
            <value>1</value>
          </second>
          <operator>GetNodeFromSymbol</operator>
        </operation>
      </first>
      <second />
      <operator>GetNodeImage</operator>
    </operation>
  </second>
  <operator>Equal</operator>
    </operation>
   </check>
  </terminating_condition>
</udf_feature_grammar>
```

Although the invention has been described above in relation to preferred embodiments thereof, it will be understood by those skilled in the art that variations and modifications can be effected in these preferred embodiments without departing from the scope and spirit of the invention.

What is claimed:

1. A computer-based feature recognition method for use in recognizing instances of features in a solid model that are identical in shape to a user-defined feature that is defined using a fixed set of connected feature faces and base faces in the solid model, said method comprising the steps of:

generating a predetermined set of attributes to be used in representing the user-defined feature; and using the feature faces and the base faces of the user-defined feature along with said set of attributes to produce a feature graph, comprising attributed nodes and arcs, which captures the shape of the user-defined feature; and using the solid model along with said set of attributes to produce a part graph comprising attributed nodes and arcs;

using said attributes to determine a unique start node in the feature graph; and using matching between the feature graph and part graph, beginning from said start node, to recognize instances of features in the solid model that are identical in shape to the user-defined feature.

2. A method as claimed in claim 1 wherein said attributes comprise the following: (i) number of convex-concave transitions in a face; (ii) number of concave chains of vertices in a face; and (iii) degree of node.

3. A computer-based feature recognition method for use in recognizing instances of features in a solid model that are identical in shape to a user-defined feature that is defined by a set of connected feature faces and base faces in the solid model and having a boundary, and with permissible feature interactions only along said boundary of the feature, said method comprising:

generating a predetermined set of attributes to be used in representing the user-defined feature;

using the feature faces and the base faces of the user-defined feature along with said set of attributes to produce a feature graph, comprising attributed nodes and arcs, which captures the shape of the user-defined feature; and using the solid model along with said set of attributes to produce a part graph comprising attributed nodes and arcs; and using matching involving the feature graph and the part graph to recognize instances of features in the solid model that are at least partially identical in shape to the user-defined feature due to interactions along the feature boundary, and wherein said interactions along boundary of feature result either in: (i) multiple base faces of said instances of the user-defined feature; or (ii) virtual faces wherein feature faces merge with other faces in the solid model.

4. A method as claimed in claim 3 wherein said attributes comprise the following: (i) number of convex-concave transitions for a face; and (ii) a scribe attribute.

5. A method as claimed in claim 3 wherein the base faces of the feature graph are ignored during said matching and wherein said attributes are matched only for the feature faces.

6. A method as claimed in claim 4 wherein the scribe attribute is used to determine if a feature face in a recognized instance is merged with any other face in said solid model thereby resulting in a virtual interaction.

7. A method as claimed in claim 6, further comprising using the scribe attribute to split the feature faces of said recognized instance by the base faces to create a well-defined feature boundary.

8. A method as claimed in claim 7 further comprising suppressing the feature from the solid model using the well-defined feature boundary.

9. A computer-based feature recognition method for recognizing pocket instances of generic pocket feature in a solid model having edges wherein the generic pocket comprises one bottom face, at least one side face, at least one top face, and may comprise at least one opening, with at least one opening face, the method comprising:

using the convexity of an edge as an attribute for finding the pocket instances in the solid model; and using the solid model to produce a face-adjacency part graph comprising nodes and arcs representing faces and edges in the solid model, along with attributes associated with the nodes and arcs of the graph; and wherein finding one of the pocket instances further comprises finding a graph representing the one pocket instance as a subgraph in the part graph; and finding said graph representing the one pocket instance comprises producing a matched graph by first matching an initial graph comprising three nodes that represent the bottom face, one side face and one top face of a potential pocket instance in the part graph and further comprises a sequence of steps wherein, in each step, the matched graph expands to a larger graph that represents a greater number of faces of the potential pocket instance; and using a set of rules to specify said sequence of steps, wherein each rule comprises three predetermined graphs comprising a start graph, a target graph and a next graph, wherein the start and next graphs are subgraphs of the target graph; and providing a terminating condition that is evaluated at the end of said sequence of steps to verify if the matched graph resulting from said sequence of steps represents a pocket instance of the generic pocket feature.

10. A method as claimed in claim 9, wherein matching said initial graph comprises finding a subgraph comprising three nodes in the part graph, wherein the arc between the nodes representing the bottom face and the one side face has a concave edge attribute, and wherein the arc between the nodes representing the one side face and the one top face has a convex edge attribute.

11. A method as claimed in claim 9, wherein said set of rules comprises a rule for incorporating multiple side faces comprising:
   using a start graph comprising at least three nodes representing the bottom face, a side face and a top face of the pocket; and
   using a target graph comprising at least four nodes representing the bottom face, two side faces, and a top face of the pocket, and a concavity attribute on the arcs representing the edges between the bottom face and the two side faces, and a convexity attribute on the arcs representing the edges between the two side faces and the top face; and
   using a next graph that is identical to said start graph.

12. A method as claimed in claim 9, wherein said set of rules comprises a rule for incorporating multiple top faces comprising:
   using a start graph comprising at least three nodes representing the bottom face, a side face and a top face of the pocket; and
   using a target graph comprising at least four nodes representing the bottom face, two side faces, and two top faces of the pocket, and a concavity attribute on the arc representing the edge between the bottom face and the two side faces, and a convexity attribute on the arcs representing the edges between the side face and the two top faces; and
   using a next graph that is identical to said start graph.

13. A method as claimed in claim 9, wherein said set of rules comprises a rule for finding an opening comprising:
   using a start graph comprising at least three nodes representing the bottom face, a side face and a top face of the pocket; and
   using a target graph comprising at least four nodes representing the bottom face, the side face, the top face and an open face of the pocket, and a concavity attribute on the arc representing the edge between the bottom face and the side face, and a convexity attribute on the arcs representing the edges between the open face and the bottom face, side face and top face; and
   using a next graph comprising of at least two nodes representing the bottom face and the open face.

14. A method as claimed in claim 9, wherein said set of rules comprises a rule for finding a plurality of faces in each opening comprising:
   using a start graph comprising at least two nodes representing the bottom face and one open face of the pocket; and
   using a target graph comprising at least three nodes representing the bottom face and two open faces of the pocket, and a convexity attribute on the arcs representing the edges between the bottom face and the two open faces; and
   using a next graph that is identical to said start graph.

15. A method as claimed in claim 9, further comprising back-tracking, wherein a set of steps of said sequence of steps can be undone, whenever said terminating condition fails.

16. A method as claimed in claim 9, in which the generic pocket feature can be specified in a grammar comprising said initial graph, said set of rules and said terminating condition.

17. A method as claimed in claim 1, wherein the step of using said attributes to determine said start node in the feature graph comprises identifying the most unique node in the feature graph by finding a node which has the maximum degree, maximum number of chains of concave vertices in the outer loop of a face, and minimum number of edge transitions, in order of preference.

18. A method as claimed in claim 1, wherein said attributes comprise number of concave-convex transitions and number of concave chains of vertices and the step matching beginning from said start node comprises matching said attributes from each face of the feature graph with the part graph.

* * * * *